United States Patent [19]

Banks

[11] 4,057,839
[45] Nov. 8, 1977

[54] TAPE CASSETTE DRIVE
[75] Inventor: Frank H. Banks, Wakefield, Mass.
[73] Assignee: MFE Corporation, Salem, N.H.
[21] Appl. No.: 643,324
[22] Filed: Dec. 22, 1975
[51] Int. Cl.² .................... G11B 15/48; G06K 7/14; G11B 5/08
[52] U.S. Cl. .................... 360/93; 235/454; 360/74
[58] Field of Search ............ 360/93, 94, 95, 96, 360/74, 62, 122; 235/61.11 E, 11 R

[56] References Cited
U.S. PATENT DOCUMENTS

| | | | |
|---|---|---|---|
| 3,231,861 | 1/1966 | French | 235/61.11 E |
| 3,443,109 | 5/1969 | Broom | 235/61.11 E |
| 3,536,894 | 10/1970 | Travioli | 235/61.11 E |
| 3,583,708 | 6/1971 | Prager | 360/94 |
| 3,584,882 | 6/1971 | Krtous | 360/94 |
| 3,619,625 | 11/1971 | Wood | 360/93 |
| 3,653,601 | 4/1972 | Wrona | 360/93 |
| 3,685,171 | 8/1972 | Kosaka | 360/94 |
| 3,925,817 | 12/1975 | Althuber | 360/74 |

Primary Examiner—Robert M. Kilgore
Attorney, Agent, or Firm—Cesari and McKenna

[57] ABSTRACT

A drive for a magnetic tape cassette. Edge and corner blocks mounted on a planar frame receive the leading edge of a magnetic tape cassette adjacent the corners thereof and position the cassette with respect to drive spindles which engage tape reels in the cassette and to a transducer located with respect to the blocks. The cassette has a notch offset from the center in the railing edge thereof. In one of two operating positions of the cassette, the notch registers with a switch, so the switch is not actuated. In the other position, the bottom surface of the cassette actuates the switch. A second switch registers with a selectively plugged recess in the trailing edge of the cassette thereby to enable or disable writing operations. A light source, disposed in the frame, transmits light along a first axis toward a detector housing. A prism in the housing intercepts and redirects the light toward a photosensitive detector. The tape interrupts the light beam except when an aperture in the tape passes the detector.

15 Claims, 6 Drawing Figures

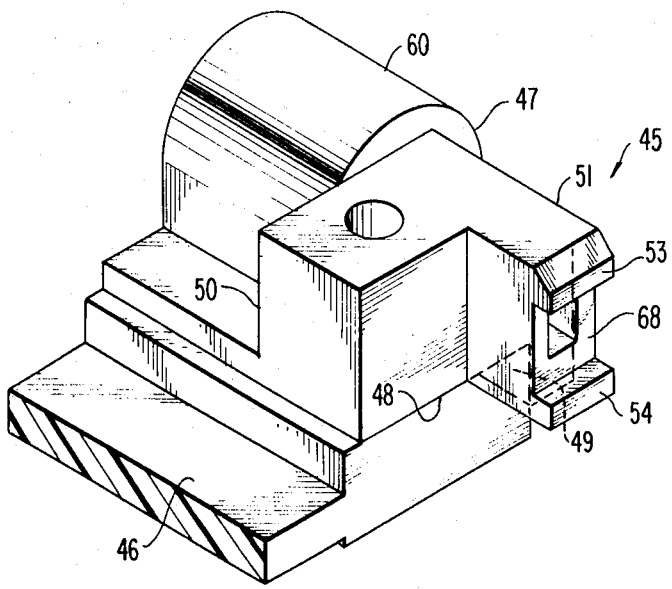
FIG. 2
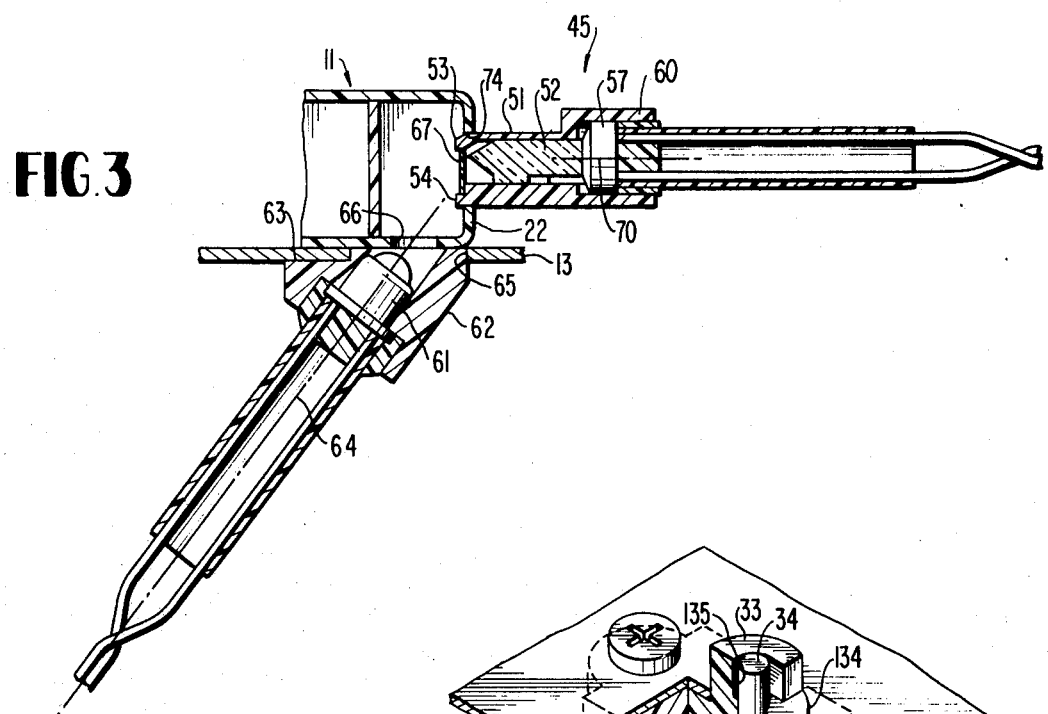
FIG. 3
FIG. 5
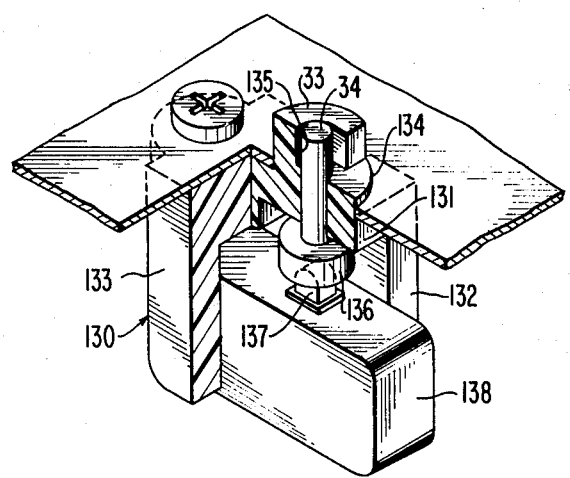

TAPE CASSETTE DRIVE

BACKGROUND OF THE INVENTION

This invention generally relates to magnetic tape cassette storage facilities for digital data processing systems and more specifically to a magnetic tape cassette drive for use in such facilities.

Magnetic tape cassette storage facilities for use in data processing system have become very popular in recent years. This popularity stems from several factors. For example, the cassette is self-contained; thus, it is easier to handle the storage media than in reel-to-reel tape storage facilities. Tape cassettes and their drives are very reliable. Moreover, these facilities are less expensive and more compact than the reel-to-reel tape facilities.

There has been adopted an industry standard for tape cassettes used in digital data processing systems. Thus, drives for these cassettes must also conform to this standard. In one such drive, the corners of the cassette defined by the intersection of the leading and side edges of the cassette engage corner and edge blocks on a frame thereby to locate the cassette in an operating position. In the operating position, magnetic tape in the cassette passes a transducer and an end-of-tape sensor.

In accordance with the foregoing standard the tape contains apertures at predetermined distances from both ends of the tape. Light from a white light source passes through a bottom opening in the cassette into a cavity behind the tape. When one of the apertures passes the sensor, light passes through a corresponding opening in the leading edge of the cassette to a detector. A portion of a housing for the detector interfits this edge opening, thereby to minimize the effects of ambient light changes, especially if the tape flutters away from the sensor. However, ambient light from above the cassette also passes into the cavity. If flutter does occur, ambient light can leak to the detector and produce a false end-of-tape reading.

Moreover, it is difficult to assemble the foregoing tape drive. The transducer and corner and edge blocks individually mount directly to the frame, and their relative positions control the alignment between the transducer and the magnetic tape. They must be positioned accurately. However, the necessary alignment procedures complicate manufacture. Further, it is extremely difficult to replace and align the transducer and edge and corner blocks away from the manufacturing location.

Therefore, it is an object of this invention to provide an improved magnetic tape cassette drive which is less susceptible to the effects of ambient light.

Another object of this invention is to provide a magnetic tape cassette drive in which the end-of-tape sensor is less susceptible to false readings.

Yet another object of this invention is to provide a tape drive in which the transducer alignment procedures are simplified.

Still another object of this invention is to provide a magnetic tape cassette drive in which transducer replacement and alignment procedures are simplified.

SUMMARY

In accordance with this invention, radiant energy from a source passes along a radiant energy axis which extends toward a sensor through registered openings in the cassette which are on opposite sides of the tape. Normally, the tape blocks any energy from reaching the sensor. However, when an end of tape aperture passes the registered openings on the cassette, the energy reaches the sensor momentarily. The sensor redirects the radiant energy to a radiant energy detector thereby to signal the passage of the end-of-tape aperture.

In addition, the transducer and a separate plate form a transducer subassembly. Accurately positioned locations on the drive frame, the edge and corner blocks and the plate control the alignment. Thus, the transducer can be accurately located with respect to the plate at the manufacturing location. This eliminates any need for subsequent alignment during manufacture or transducer replacement. Moreover, radiused surfaces on the edge and corner blocks engage the leading edge of the tape cassette to locate the tape cassette more accurately with respect to the transducer.

This invention is pointed out with particularity in the appended claims. A more thorough understanding of the above and further objects and advantages of this invention may be better understood by referring to the following detailed description taken in conjunction with the accompanying drawings.

BRIEF DESCRIPTION OF THE DRAWINGS

FIG. 2 is a perspective view of an end-of-tape sensor shown in FIG. 1;

FIG. 3 is a cross section of the sensor taken along lines 3—3 in FIG. 1;

FIG. 5 is a perspective view, partially broken away, of a cassette sensing switch in FIG. 1.

DESCRIPTION OF AN ILLUSTRATIVE EMBODIMENT

Figure 1:
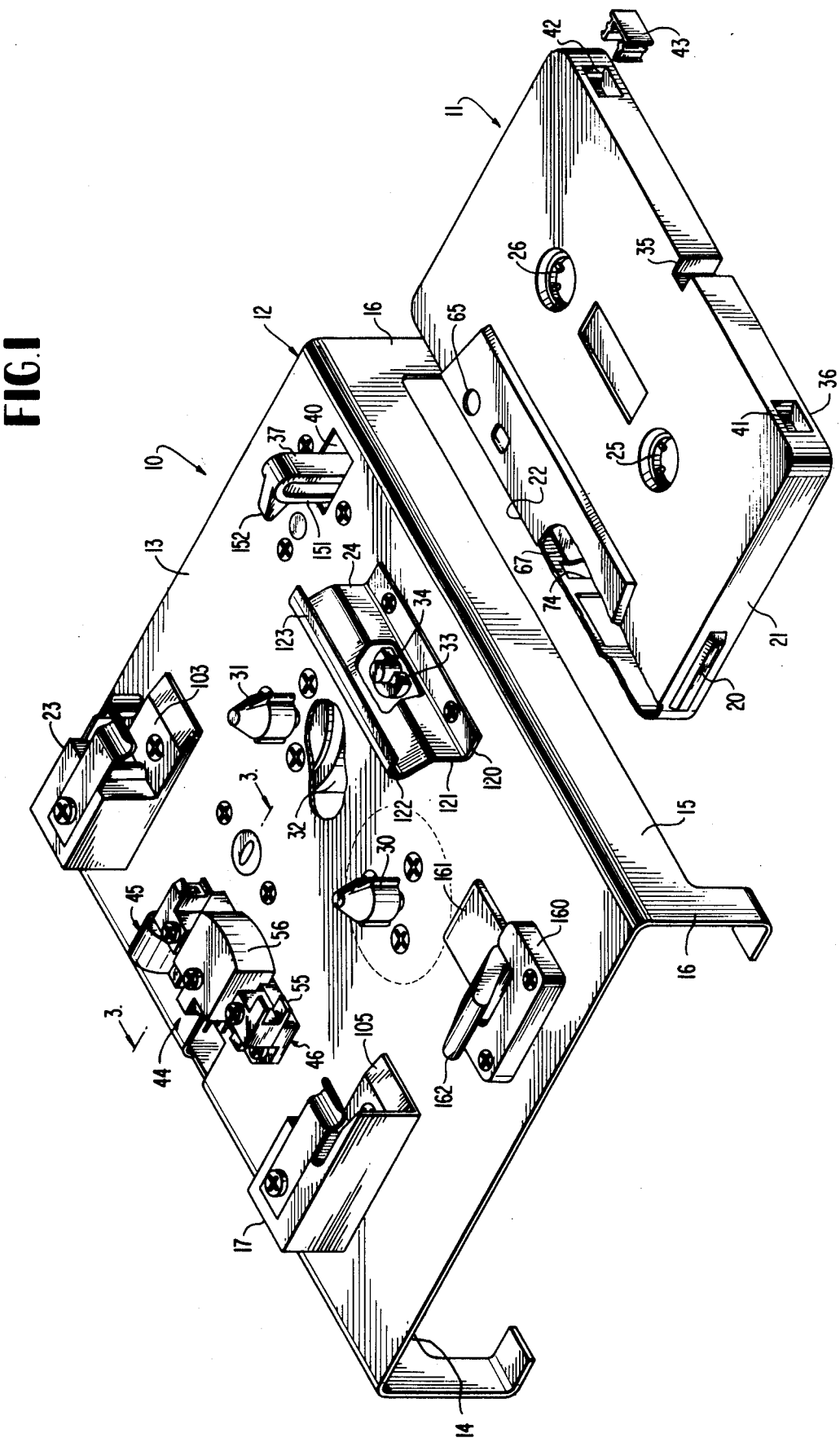
FIG. 1 is a perspective view, partially broken away, of a magnetic tape cassette and a drive constructed in accordance with this invention.

FIG. 1 depicts a tape drive 10 and a conventional magnetic tape cassette 11. All the elements on the tape drive mount on an open frame 12 which includes a plate portion 13, front and back side skirt portions 14 and 15 and depending legs 16. Other elements, not shown, such as the circuit board which controls the operation of and receives signals from various elements shown in FIG. 1 mount to the frame 12.

As the tape cassette 11 is inserted into the drive, a corner block 17 initially engages a ridge 20 on the cassette 11 formed along an edge portion 21 adjacent a leading edge 22. A similar ridge formed on the opposite edge portion engages an edge block 23. The corner and edge blocks 17 and 23 position the cassette 11 so it extends over a spring catch 24 disposed adjacent the skirt 15. When the cassette 11 reaches a first position resting atop the spring catch 24, reel hubs 25 and 26 align with drive spindles 30 and 31 connected to drive motors, such as the drive motor 32 shown in association with spindle 31. The cassette 11 is then forced downwardly displacing the spring catch 24 and bottoming into an operating position defined by the corner and edge blocks 17 and 23 and the surface of a semicircular platform 33. The platform 33 partially surrounds a switch actuator 34 which extends through the plate 13.

In one operating position, the cassette 11 depresses the actuator; in the other, the actuator 34 is in register with notch 35 in the trailing edge 36 of the cassette 11 and is not actuated.

When the cassette 11 is properly positioned, an actuator arm 37 which extends up and through an aperture 40, aligns with one of two recesses 41 or 42 in the trailing edge 36. The actuator arm 37 senses whether the hole in register with it contains a plug 43 thereby to enable or disable writing operations on that side of the tape.

A transducer sub-assembly 44 also mounts to the plate portion 13 and includes a detector 45 which senses the passage of an aperture adjacent either end of the tape or any of the aperture in the tape. Depending upon the orientation of the tape cassette 11, a given end of tape aperture may signal either the beginning or end of the tape. In the following discussion I merely refer to these apertures generally.

The transducer sub-assembly 44 also includes a mounting plate 46 for the detector 45, shown in more detail in FIG. 2. Referring to FIG. 2, the detector 45 includes an integral detector housing 47 having a bottom locating surface 58 to be positioned on the plate 46 and a surface 49 on a depending locating lug which engages the edge of the plate 46. The surfaces 48 and 49 thereby position the detector housing 47 horizontally between the corner and edge blocks 17 and 23 and vertically as shown in FIG. 1.

Still referring to FIG. 2, a rectangularly shaped body portion 50 includes a rectangular extension 51 which receives a prism 52, as shown in FIG. 3. Two tapered fingers 53 and 54, shown in FIGS. 2 and 3 extend from the extension 51 to engage the edges of the tape. The fingers 53 and 54 coact with a tape positioner 55 disposed an opposite side of a transducer 56 as shown in FIG. 1, to minimize tape skewing as the tape passes the transducer 56.

Referring to FIG. 3, the prism 52 is recessed in the extension 51 and directs light to a detector 57 located in a cylindrical housing 60. The detector 57 senses radiant energy provided by a radiant energy source 61, such as a light-emitting diode, mounted in a housing 62 under the frame portion 13. An oblique surface 63 on the housing 62 establishes a light axis 64 through an aperture 65 in the frame portion 13 and then through an aperture 66 in the bottom surface of the tape cassette 11 (FIGS. 1 and 3). While the tape 67 normally blocks light, light passes through the tape 67 along the axis to the prism 52 when an aperture passes the detector 45. The prism 52 redirects the light travelling along the axis 64 to travel along an intersecting axis 70 to the detector 57.

As shown in FIG. 3, a portion of the extension 51 including the fingers 53 and 54, interfits a hole 74 formed in the leading edge 22 of the tape cassette 11. These fingers block ambient light. As the cassette 11 is inserted, a recessed surface 68 (shown in FIG. 2) bears against the tape 67 and slightly deflects the tape 67 so it tends to remain against the surface 68. In combination with the fingers 53 and 54, there thus is provided a means for blocking ambient light from the detector 57. Moreover, the prism 52 receives light from below tape 67 along the axis 64, so ambient light, which might otherwise produce a false signal if the tape 67 were to flutter, is blocked from reaching the detector 57. Thus, the chance of a false signal induced by ambient light is remote because any relfected light from the bottom surface 65 of the tape cassette is at a low level which does not produce a signal. If the light source 61 is a light-emitting diode, its energy is predominantly in the infra-red band, so the detector 57, which is sensitive to the same band, is less sensitive to ambient light.

This aperture sensor including the light source 61 and detector 45 has several advantages. The prism 52 allows light from a selected direction to be monitored while providing a compact mechanical design. As the elements of the tape drive above the plate portion 13 in FIG. 1 are generally exposed, it is desirable to minimize upstanding structures above the surface. Moreover, as previously indicated, this structure is less likely to produce false aperture signals.

Figure 4:
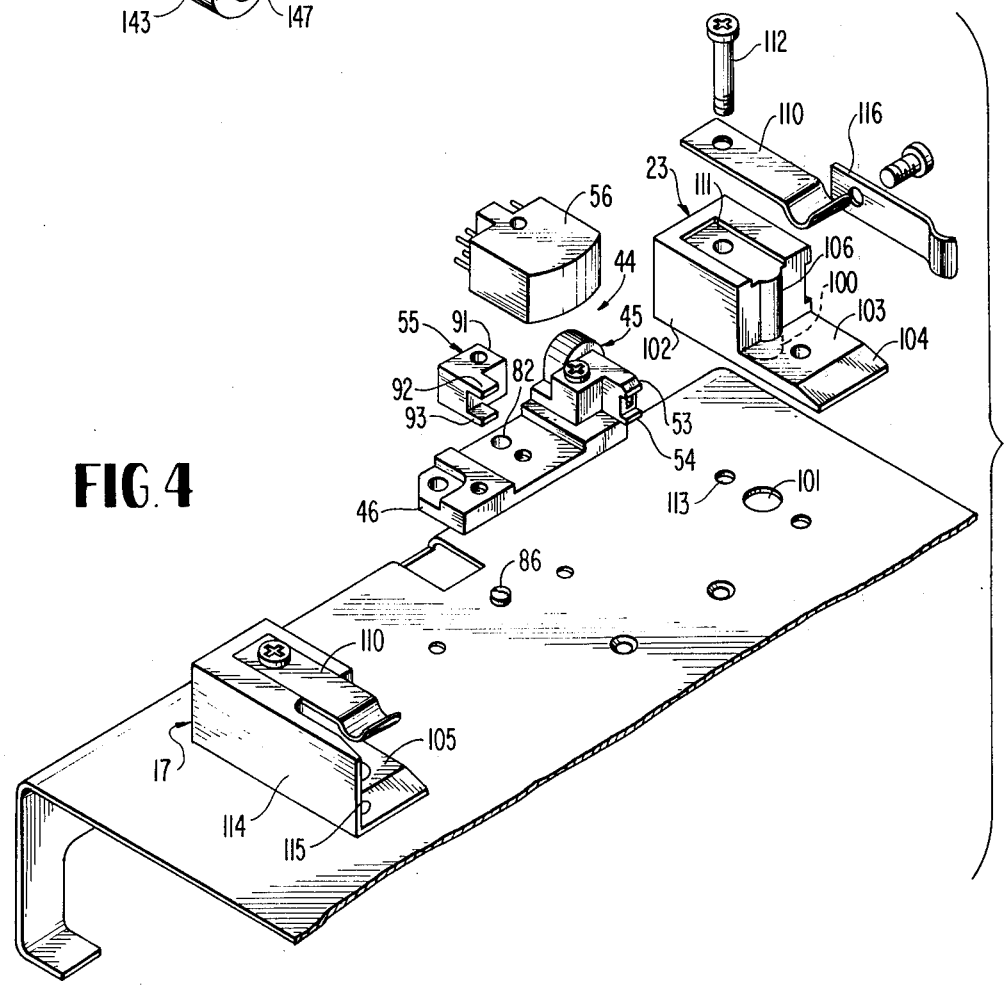
FIG. 4 is an exploded perspective view of a portion of the tape cassette drive showing the edge and corner blocks and transducer subassembly shown in FIG. 1 in more detail.

Now referring to FIG. 4, the transducer subassembly 44 is shown in more detail. The plate 46 includes a locating hole 82 that is located accurately with respect to the tape engaging surface of the transducer 56. When the sub-assembly 44 is mounted to the plate portion 13, a locating pin 86 mates with the locating hole 82 thereby to accurately locate the plate 46 and the transducer 56. The locating pin 86 therefore serves as a reference point from which all other elements are located including the edge block 23 and the corner block 17.

The tape guide 55 also is mounted on the base plate 46 and includes a block portion 91 and parallel spaced extensions 92 and 93 which extend toward the tape cassette beyond the tape engaging surface of the transducer 56. These arms 92 and 93 interfit with one of the openings 74 in the tape cassette. As previously indicated, the guide 55 and fingers 53 and 54 on the detector 45 coact to position accurately the tape with respect to the surface of the transducer 56. The tape guide 55, transducer 56 and detector 45 are all accurately located with respect to the plate 46 at the manufacturing facility to thereby form a separate subassembly which is subsequently mounted to the plate portion 13.

Still referring to FIG. 4, the edge block 23 has a molded, integral locating pin 100 which fits in a locating hole 101 positioned relative to the locating pin 86. A like locating pin and hole locate the corner block 17.

Referring specifically to the edge block 23, it comprises a hollow body portion 102 from which a base portion 103 extends. The base of portion 103 terminates in a ramp 104 which guides the lower corner of the leading edge 22 of the tape cassette 11 (FIG. 1) onto the base portion 103. The surface of the base portion 103 is coplanar with a base portion 105 in the corner block 17 and the semicircular platform 33 shown in FIG. 1 to provide a reference plane for positioning the cassette 11.

A cylindrical surface 106 normal to the base 103 positions the tape cassette with respect to the transducer 56. The surface 106 is an extension of the locating pin 100 so that the surface 106 does not shift with respect to the locating pin 86 even if the edge block 23 skews slightly during assembly. Thus, manufacturing is simplified.

Both the corner and edge blocks 17 and 23 have similar construction and include top spring clamps 110 spaced from their respective base portions 105 and 103. In each, the clamp 110 is held in a recess 111 formed in the block 102 by a screw 112 which passes through the block 102 and engages a tapped hole 113 in the plate portion 13.

With specific reference to the corner block 17, an integrally molded vertical extension 114 is normal to the base 105 and extends toward the back. It has a ramped surface 115, and the side portion 114 engages the ridge 20 in FIG. 1 to position the cassette 11 in a direction parallel to an axis between the locating holes for the corner and edge blocks 17 and 23.

In the edge block 23, a spring 116 replaces the integrally formed side portion 114. It mounts to the outer side of the block 102 and engages the other ridge on the tape cassette 11 thereby to bias the tape cassette toward the side extension 114 on the corner block 17. Thus, the edge and corner blocks 23 and 17 properly orient the tape cassette with respect to the spindles 30 and 31 and the transducer 56 in FIG. 1. If either or both blocks skew slightly, they still properly position the tape cassette 11 because the cylindrical surfaces 106 are coextensive with the surface of the locating holes 101. As any minor misalignment of the tape cassette 11 along a line between the holes 101 is absorbed by the play in the drive wheels 25 and 26 in the tape cassette 11 shown in FIG. 1, the cassette 11 and the transducer 56 remain in alignment.

Referring again to FIG. 1, the spring catch 24 comprises an integral member including a base portion 120 affixed to the plate portion 13, an upstanding portion 121 and a reversely bent portion 122 which terminates in an upper surface 123. When the leading edge 22 of the tape cassette 11 is located on the base portions 103 and 105 of the corner and edge blocks 17 and 23, the trailing bottom edge of the tape cassette 11 rests on the upper surface 123. When the cassette is then pushed toward the plate portion 13, it displaces the surface 123 and the upstanding portion 121 away from the transducer assembly 44 until the tape cassette is properly located against the platform 33. Then the spring catch 24 returns and overrides the top trailing edge thereby to lock the tape cassette in position.

In one application of the tape drive unit shown in FIG. 1, the tape has permanent clock track on one side. Under the terms of the previously mentioned cassette standard, the notch 35 in the trailing edge indicates which side or track is aligned with the track of the transducer 56. If the clock track is aligned, the actuator 34 and notch 35 are aligned. In one embodiment this prevents tape cassette operation.

FIG. 5 shows this assembly in more detail. It comprises a switch housing 130 with a base portion 131 and bifurcated depending arms 132 and 133. An upstanding collar 134 locates the switch housing 130 and terminates with the platform 33. An aperture 135 through the collar 134 receives an upstanding pin portion which forms the plunger 34 and terminates in a disk 136 captured between an actuator 137 on a switch 138 and the base 131. The switch 138 is held between the arms 132 and 133. When the tape cassette is properly loaded, it depresses the plunger 34 and the actuator 137. When the cassette is removed or improperly loaded, an internal spring mechanism in the switch 138 forces the actuator 137 out and drives the plunger 34 upwardly.

As previously indicated, a tape cassette 11 has recesses 41 and 42 formed in the trailing edge 36 (FIG. 1). The switch actuator 37 senses whether an aligned recess contains the plug 43. Now referring to FIG. 6, the switch comprises a base portion 141 to be connected below the plate portion 13. Integrally formed bifurcated arms 142 and 143 carry a switch 144 with a depending actuator 145. An L-shaped link 146 rotates on a pivot 147 and has a horizontal arm 150 which, when rotated counter-clockwise, drives the actuator 145 and actuates the contacts. A vertical arm 151 controls the rotation of the arm 150 and extends beyond the body portion 141 through the aperture 40 shown in FIG. 1. It includes an inwardly facing triangular beak 152. Normally an internal spring in the switch 144 and the actuator 145 drive the arm 151 clockwise to a rest position toward the edge block 23 as shown in FIG. 1. When the cassette 11 is inserted, its bottom surface and trailing edge cam the beak 152 away from the edge block 23. When the tape cassette is properly positioned, the actuator 145 tries to drive the arm 150 clockwise. If the recess is empty, the beak 152 enters. On the other hand, if the recess contains a plug, the beak 152 can not return to its normal position so the switch 144 is actuated.

Figure 6:
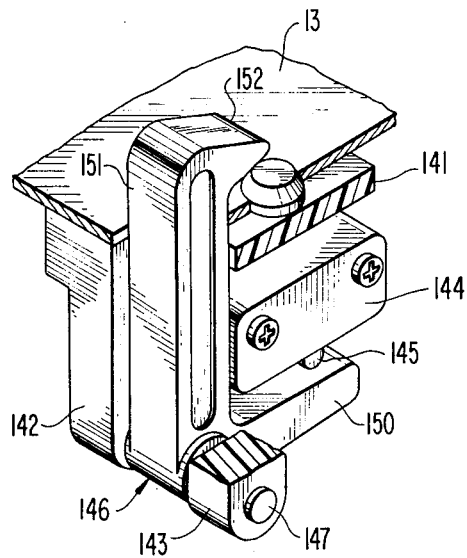
FIG. 6 is a perspective view, partially broken away, of a write protection switch shown in FIG. 1.

Thus, the switches 138 and 144 in FIGS. 5 and 6 prevent improper operation. First, it is not possible to use a cassette with a clock track on the tape unless the cassette is properly inserted, such that the tape cassette shown in FIG. 1 moves the plunger 34. Moreover, it is not possible to alter the contents of the tape unless a proper recess in the trailing edge of the cassette contains a plug.

When a cassette is to be removed, it is merely necessary to actuate a release member comprised of a U-shaped base 160 shown in FIG. 1 mounted to the frame portion 13. The base 160 captures radiused extensions on a release member comprising a base portion 161 and an actuating portion 162. When an operator pushes the actuating portion down, the member pivots the base portion 161 and drives the cassette 11 upward. As the cassette 11 pivots about its lower leading edge, it drives the spring catch 24 backward and forces the trailing edge of the cassette up and past the portion 122. Then the tape cassette 11 can be withdrawn easily.

In summary, I have disclosed an improved magnetic tape cassette drive. It includes an aperture sensor which minimizes any false responses produced by tape flutter and includes an upwardly directed infra-red source which directs light obliquely through an aperture in the tape to a prism. The prism redirects the light along a second axis to a detector. Moreover, my drive includes various locating means on elements connected to a frame portion which simplify manufacture and any subsequent replacement which may become necessary from time to time.

Although my invention is disclosed by describing a single embodiment, it will be apparent the specifically disclosed structure may be altered and yet still provide all or some of the aforementioned advantages. Therefore, it is an object of the appended claims to cover all such variations and modifications as come within the true spirit and scope of this invention.

What I claim as new and desire to secure by Letters Patent of the United States is:

1. A tape drive for a tape cassette wherein the cassette includes a substantially rectangular cassette housing containing first and second reels of tape and means for guiding the tape past a series of openings formed along a leading edge of the cassette and formed in surfaces normal to the leading edge adjacent thereto, the tape having an aperture formed therein, said tape drive comprising:
   A. a frame member,
   B. first and second motor drive spindles mounted to said frame member for driving the tape cassette reels,
   C. transducer means mounted to said frame member to contact the tape through a first of the tape cassette openings,
   D. a radiant energy source for directing radiant energy into the tape cassette through a second of the tape cassette openings along a radiant energy axis which intersects the plane of the tape and which passes through a third of the tape cassette openings, and E. means for sensing the radiant energy including
  i. a sensor housing having a longitudinal cavity formed therein along a cavity axis which intersects the radiant energy axis,
  ii. a radiant energy detector mounted in said cavity on the cavity axis and displaced from the radiant energy axis,
  iii. means in said cavity for redirecting the radiant energy received along the radiant energy axis to parallel the cavity axis, and
  iv. first and second spaced fingers extending from said sensor housing and interfitting the third cassette opening thereby to accommodate the tape, said fingers guiding the tape and blocking ambient light from reaching said detector.

2. A tape drive as recited in claim 1 wherein said radiant energy sensing means includes means for mounting said sensing means to said transducer means and said radiant energy source defines a radiant energy axis which is oblique with respect to frame member.

3. A tape drive as recited in claim 1 wherein said redirecting energy means in said sensing means comprises a prism.

4. A tape drive as recited in claim 1 wherein said radiant energy source comprises a light-emitting diode for transmitting energy in the infra-red spectrum.

5. A tape drive as recited in claim 1 wherein said transducer means additionally comprises a tape transducer, tape guide means, and a mounting plate connected to said frame member for supporting said sensing means, said tape transducer and said tape guide means, said tape transducer being interposed between said tape guide and sensing means whereby said tape guide means and said spaced fingers control the position of the tape past said tape transducer.

6. A tape drive as recited in claim 1 additionally comprising edge and corner blocks mounted to said frame member, each of said edge and corner blocks, said sensing means and said frame member having complementary locating means, said locating means on said frame member for said sensing means and said edge and corner blocks being positioned relative to each other.

7. A tape transport as recited in claim 6 wherein each of said edge and corner blocks includes a radiused surface for engaging a leading edge of the tape cassette thereby to position the tape cassette in said drive.

8. A tape drive as recited in claim 1 wherein the tape cassette additionally includes an offset notch formed in the trailing edge thereof, said tape drive additionally comprising:
F. switch means mounted to said frame member including an actuator positioned for alignment with the notch in one position of the tape cassetts, the tape cassette, in its other position, engaging said actuator thereby to activate said switch means.

9. A tape drive as recited in claim 8 wherein:
F. said switch means additionally includes a planar platform partially surrounding said actuator, and
G. said drive additionally comprises edge and corner blocks for engaging the leading edge of the tape cassette, each of said blocks having planar surfaces formed thereon thereby to define with said platform a reference plane for the tape cassette.

10. A tape drive for a magnetic tape cassette including a cassette housing with leading, side and trailing edges and means for guiding the tape past a plurality of openings in the leading edge, said tape drive comprising:
A. a frame member,
B. first and second spaced motor driven spindles protruding from said frame member,
C. edge and corner blocks on said frame member at first and second spaced reference positions on said frame, said blocks receiving the leading edge of the tape cassette adjacent the respective side edges thereof, and
D. a transducer assembly mounted between said edge and corner blocks for engaging the tape through a first of the openings in the leading edge, said transducer assembly including:
  i. a transducer, and
  ii. a mounting plate including means for locating said plate at a third reference point on said frame member, said plate supporting said transducer at a known position thereon thereby to locate accurately said transducer with respect to said edge and corner blocks.

11. A tape drive as recited in claim 10 wherein said tape cassette additionally includes a cassette housing, a notch being formed at the edge of said cassette housing that is displaced from the center of the cassette, said tape drive additionally comprising:
E. switch means mounted to said frame member in register with the notch in only a first position of the tape cassette, said switch means including:
  i. a switch;
  ii. a plunger to be depressed when the tape cassette is inserted in a second position thereof thereby to control said switch, and
  iii. a platform portion about said plunger having a surface for forming with corresponding surfaces on said edge and corner blocks an operating plane for said tape cassette.

12. A tape drive as recited in claim 11 wherein the tape has an aperture formed therein, said drive additionally comprising:
F. a light source mounted to said frame member for directing radiant energy obliquely toward the tape through a second of the openings in the tape cassette, and
G. sensing means for receiving energy through a third of the openings in the tape cassette when the tape aperture passes.

13. A tape drive as recited in claim 12 wherein said sensing means includes,
  i. housing means having tape guiding fingers integrally formed therewith,
  ii. reflecting means mounted in a cavity of said housing for intercepting the radiant energy when the tape aperture passes,
  iii. a detector mounted in said housing for receiving energy from said reflecting means along a second axis, the first and second axes being oblique with respect to each other.

14. A tape drive for a tape cassette wherein the tape cassette includes a leading edge, a parallel trailing edge and an offset notch formed in the trailing edge, said tape drive comprising:
A. a frame member,
B. transducer means connected to said frame member,
C. means for positioning the cassette in one of two orientations with respect to said transducer means, D. switch means mounted to said frame member, said switch means including:
  i. switch means, and
  ii. an actuator for said switch means, said actuator being in register with the notch in a first orientation of the tape cassette and out of register with the notch in the second orientation of the tape cassette.

15. A tape drive as recited in claim 14 wherein:
C. said positioning means includes means for establishing an operating plane for the tape cassette, and
D. said switch means additionally includes a housing having a cassette positioning portion surrounding said actuator, said portion having a surface that is co-planar with the plane established by said positioning means.

* * * * *

UNITED STATES PATENT AND TRADEMARK OFFICE
CERTIFICATE OF CORRECTION

PATENT NO. : 4,057,839
DATED : November 8, 1977
INVENTOR(S) : Frank H. Banks

It is certified that error appears in the above-identified patent and that said Letters Patent are hereby corrected as shown below:

IN THE ABSTRACT - line 7, delete "railing" and insert --trailing--

Column 3, line 24, delete "58" and insert --48--

Column 3, line 68, delete "relfected" and insert --reflected--

Column 7, line 58, delete "cassetts" and insert --cassettes--

Signed and Sealed this

Twenty-second Day of August 1978

[SEAL]

Attest:

RUTH C. MASON
Attesting Officer

DONALD W. BANNER
Commissioner of Patents and Trademarks